UNITED STATES PATENT OFFICE.

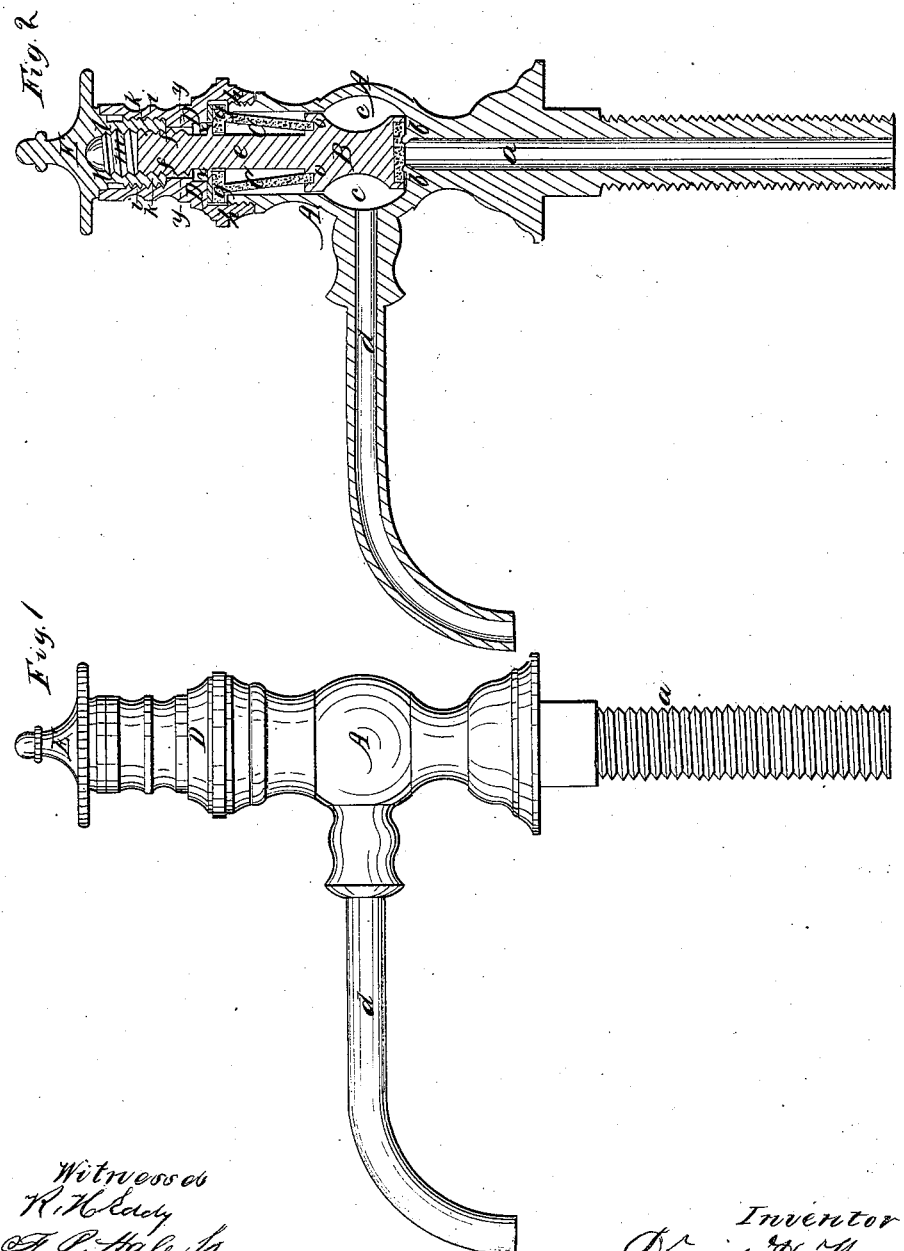

DAVID H. THORP, OF CHELSEA, MASSACHUSETTS, ASSIGNOR TO BOSTON FAUCET COMPANY, OF BOSTON, MASSACHUSETTS.

FAUCET.

Specification of Letters Patent No. 28,819, dated June 19, 1860.

*To all whom it may concern:*

Be it known that I, DAVID H. THORP, of Chelsea, in the county of Suffolk and State of Massachusetts, have invented an Improved Basin-Faucet, and do hereby declare the same to be fully described and represented in the following specification and the accompanying drawings, of which—

Figure 1, is a side view, and Fig. 2, a vertical section of it.

The nature of my invention consists in a combination and arrangement of an elastic tubular packing with screws for raising and depressing the valve as hereinafter described.

In the drawings, A, exhibits the body or valve case of the faucet as furnished with an induction passage $a$, a valve seat, $b$, $b$, a valve chamber, $c$, and a bib or discharging pipe, $d$, the whole being arranged as shown in the drawings. Within the said chamber, $c$, a valve, B, is placed and rests on the seat, $b$, $b$. The stem, $e$, of the valve is provided with a male screw, $f$, at its upper part, and passes through a tubular, conical, elastic packing, C, made of vulcanized india rubber and formed with a flanch, $g$, to rest on the top of the valve case, A, and to be forced down upon the same by a cap, D, screwing upon the part, A, as shown at $h$, $h$. This cap has within it a female screw, $i$, which receives a male screw, $k$, formed on the shank, $l$, of a thumb nut, E. Within the lower part of the said shank, $l$, a female screw, $m$, to receive the screw, $f$, is cut. The threads of the two male screws, $k$, and $f$, should be pitched in opposite directions, or in other words, such screws are what are usually termed "reversed screws."

The elastic packing, C, at its lower end fits closely into a circular groove, $o$, $o$, formed in the valve. By the mode of applying the packing it not only performs the function of packing the valve stem and the cap, but operates as a means of preventing rotary motion of the valve stem while the nut, E, is being revolved on the stem and within the cap, D, or screw, $i$, thereof.

I am aware that it is not new to employ an elastic tubular packing in a basin faucet, as such is found described in the United States Patent, No. 12195, where it is represented as serving not only to pack the valve, but to operate in connection with a cam lever, the latter being applied and arranged so as to lift the valve against the elastic power of the packing, in which case, the elastic packing is relied on as the only means of forcing the valve down toward and upon its seat. One difficulty with this last mentioned application of packing and cam lever, to the valve stem, is, that the packing is apt to lose its elasticity and consequently cause the valve to rise off its seat and thereby render the faucet liable to leak. Another difficulty is, that although the cam lever will raise the valve off the seat, such lever has to be turned down into or below a horizontal line, or its lowest position in order to maintain the valve so elevated. Any less movement of the cam lever requires it to be held by the hand of the mover or it will fly back to its vertical position, and the valve will descend upon its seat.

In my improved faucet, the valve is raised off and forced toward its seat by screws, and I do not depend upon the tubular spring packing to depress the valve, its only function being to pack the valve stem and the case cap and to operate as a brake or holder of the valve in order to prevent it from revolving, while the screw nut of the cap is being revolved either to raise or depress the valve relatively to its seat. Thus it will be seen, that by means of the screws, I can raise the valve more or less above its seat, and retain it at any desirable elevation in order that there may be either a large or small amount of flowage of water through the bib. Thus it will be seen that my improved faucet presents advantages over the other herein before mentioned.

In order to prevent the too great compression of the packing, C, the stem, $e$, of the valve, B, is provided with a projection or stop, $x$, which when the valve, B, is sufficiently elevated off its seat brings up against a seat or shoulder, $y$, arranged in the cap, D, as shown in Fig. 2.

I do not claim so arranging the elastic packing, that it shall perform the duties of not only packing the valve stem, but pressing the valve toward its seat and elevating a cam lever attached to the valve stem and employed to raise the same, nor do I claim the combination of an annular lifter or lifters, guide and pin or the same and a top incline for closing the valve, the whole being as shown in the United States Patent No. 17,604, and granted June 16th, 1857.

What I claim as my invention or improvement is—

In the basin faucet, having a conical, tubular elastic packing, C, made and applied to its valve, the stem and case thereof as described, the arrangement of the stop, $x$, and its shoulder, $y$, or chamber by which such shoulder is formed in the part, D, with operating screws $i$, $k$, $f$, $m$, and a tubular elastic packing, C, applied to the valve stem, $e$, and its valve, B, substantially as specified.

DAVID H. THORP.

Witnesses:
R. H. EDDY,
W. P. HALE, Jr.